Aug. 8, 1961  J. PATERA  2,994,920
APPARATUS FOR MAKING A SHOE WITH MOLDED SOLE
Filed Aug. 30, 1957  4 Sheets-Sheet 4
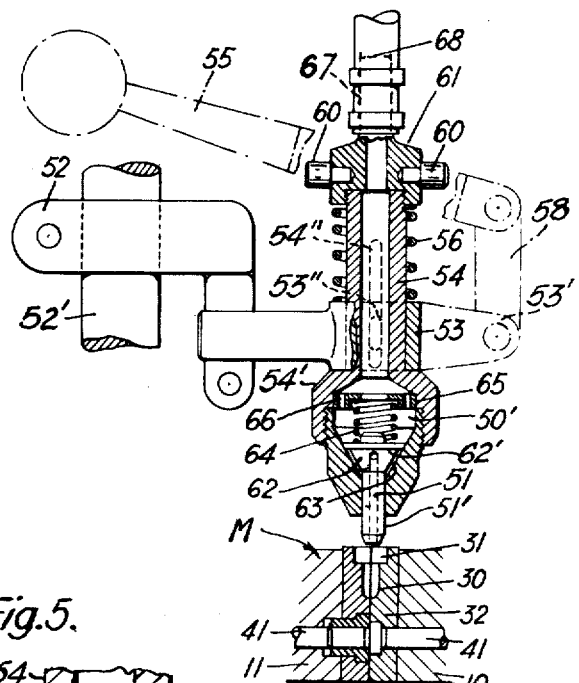
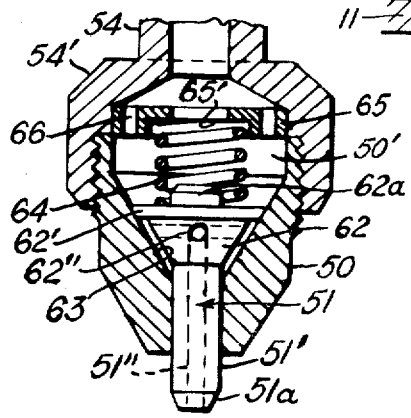
INVENTOR
JAROMIR PATERA

United States Patent Office 2,994,920
Patented Aug. 8, 1961

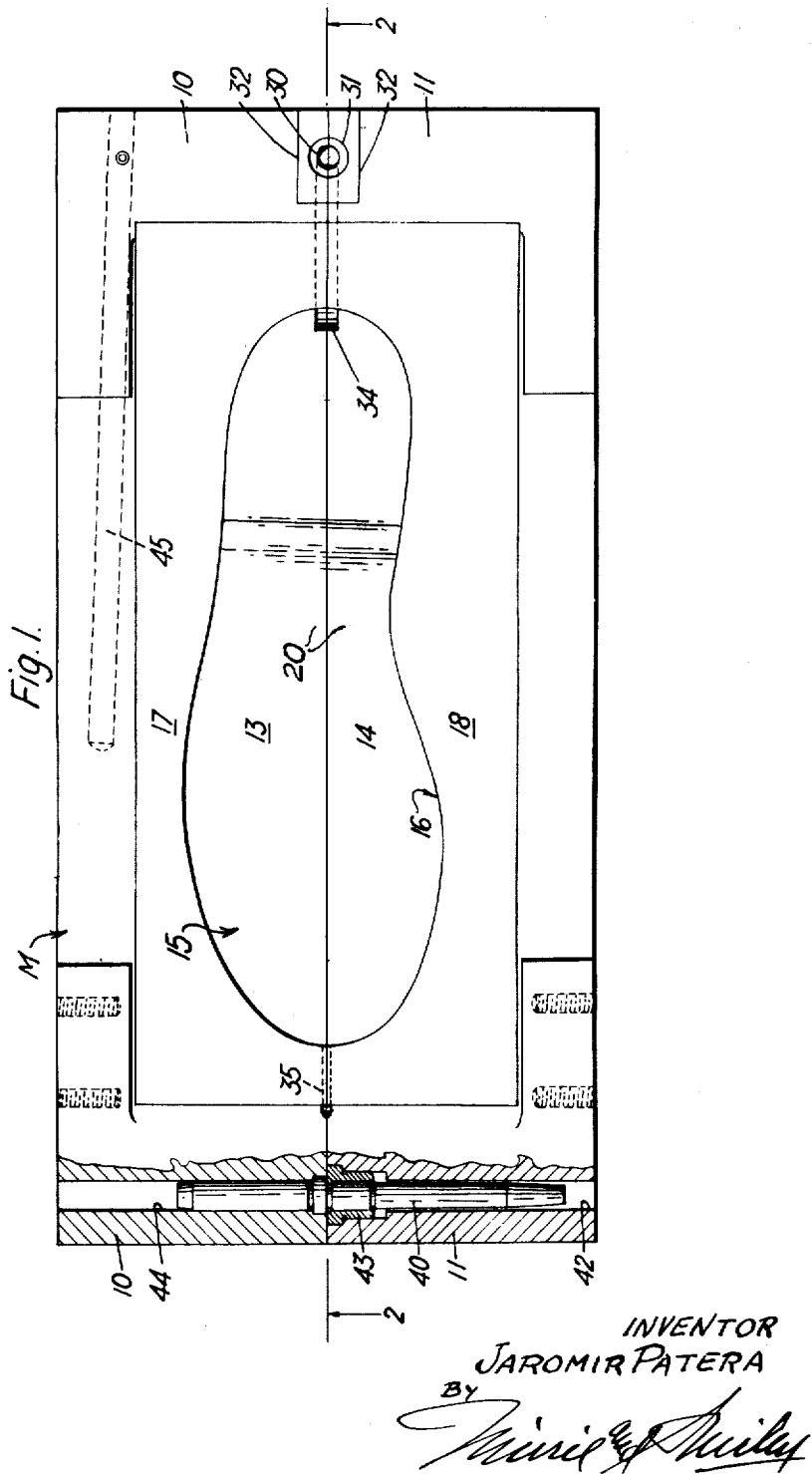

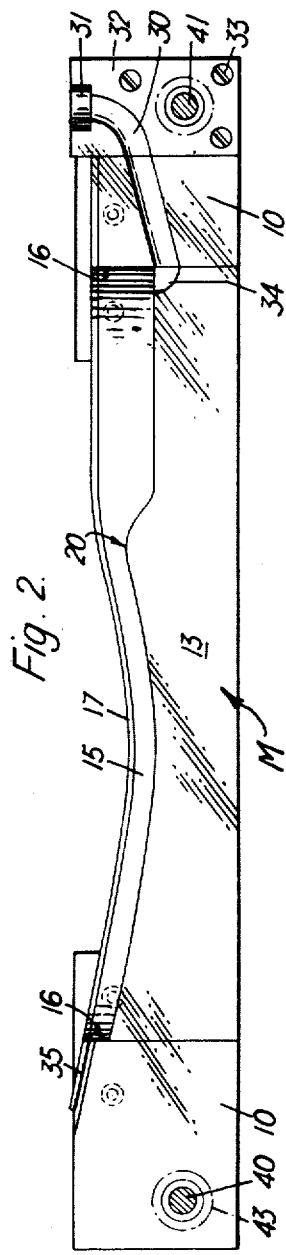

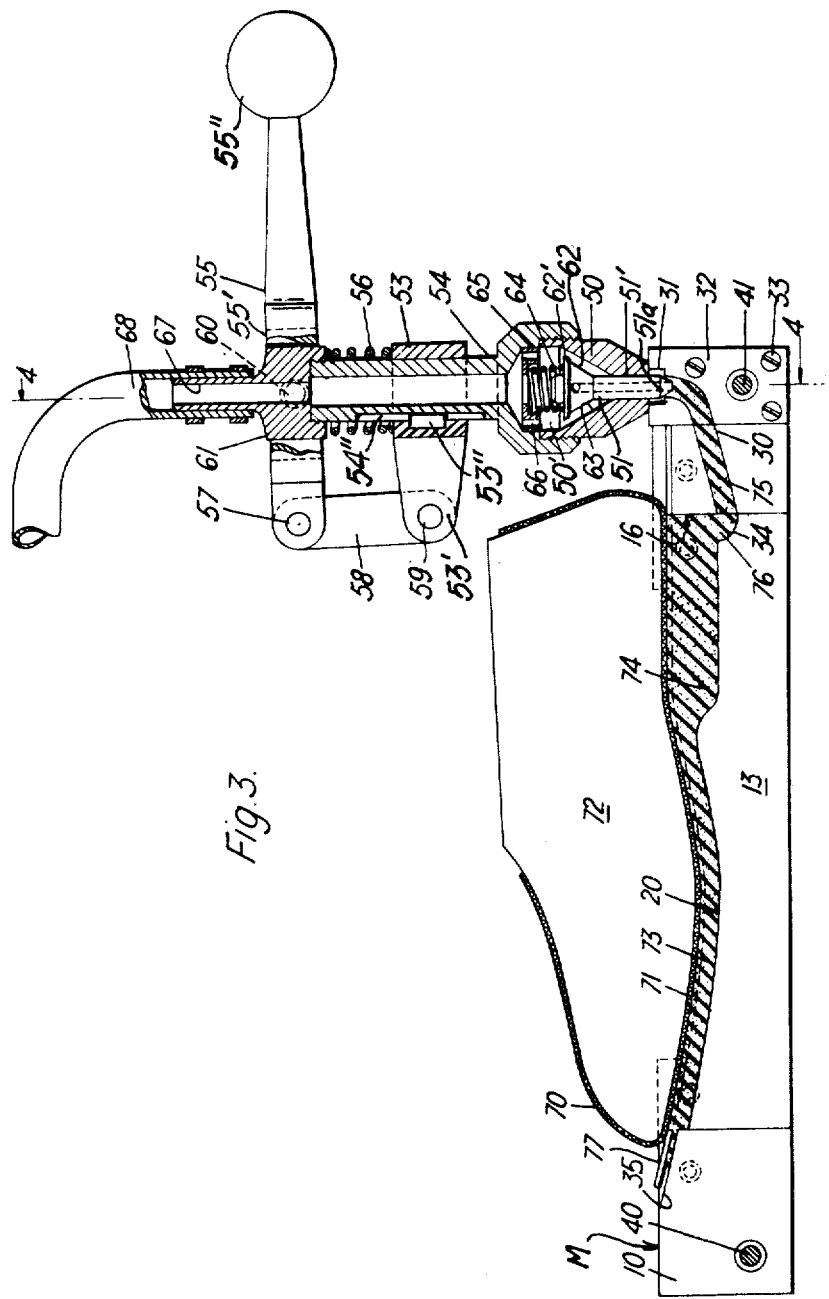

2,994,920
APPARATUS FOR MAKING A SHOE WITH MOLDED SOLE
Jaromir Patera, Vernon, France, assignor to Bata Shoe Company, Inc., Belcamp, Md., a corporation of Maryland
Filed Aug. 30, 1957, Ser. No. 696,896
1 Claim. (Cl. 18—30)

This invention relates to shoes and the method and apparatus for making shoes or other like articles of footwear, such as boots, slippers and sandals, hereinafter called shoes, and more particularly to shoes having a rubber or plastic sole and the manufacturing thereof by molding a sole composed of a synthetic rubber-like plastic onto an upper.

In the manufacture of shoes having soles adhesively secured by cement to the uppers, where the surfaces to be cemented can be adequately prepared, for instance by cleaning and roughening such surfaces, it is customary to coat both surfaces beforehand and unite them by applying pressure. The upper and insole are supported as a unit by a last or other former so as to leave exposed an inturned margin of the upper around the insole, the entire bottom surface being prepared and cement-coated; a sole precut to shape and with its inner surface prepared and cement coated is applied to the bottom of the lasted unit so as to adopt under pressure a form complementary to the bottom.

It is important that pressure should be applied substantially and uniformly throughout the contact area so that a union is produced which will endure throughout the life of the shoe, despite the heavy and varied strains to which the ordinary shoe of this type is subjected.

While the surfaces of most shoe materials, for instance leather and textiles, are well suited to this procedure, it has been found that the cementing procedure is not completely satisfactory because of the difficulty of preparing the rubber-like plastic sole so that it will properly adhere to the upper. The surface of such a sole tends to seal itself against penetration by cement, so that cement does not adhere with sufficient intimacy or tenacity.

Having in mind the defects of the prior art shoes and methods and apparatus for making same, it is a principal object of the present invention to provide a shoe having a molded sole of rubber-like plastic that will permanently adhere to the upper.

It is another object of the invention to provide a shoe having a molded sole and which has simplicity of design, economy of construction and efficiency in use or operation.

It is still another object of the invention to provide a method of making a shoe with a molded sole and which has simplicity, economy and efficiency in operation.

It is a further object of the invention to provide an apparatus for making a shoe with a molded sole and which has simplicity of design, economy of construction and efficiency in operation.

The foregoing objects and other ancillary thereto are preferably accomplished, in accordance with the present invention, by a shoe including an upper with a sole of rubber-like plastic molded directly onto the upper.

The method, according to the invention, briefly, comprises applying the bottom surface of a shoe upper to the mouth of the mold so as to close it, filling the mold with a synthetic rubber-like plastic in a fluid condition so that the fluid embeds itself in the bottom surface and adopts the sole-form of the mold, and heating the plastic to solidify it. Thereafter, the solidified sole is cooled so that it sets, this being the stage at which adhesion between the upper and the plastic sole is completed.

The apparatus, according to the invention, briefly, may comprise separable adjoining parts jointly forming a mold having an open-mouthed sole-form cavity adapted to be closed by a lasted shoe upper applied to the lip of the cavity, said parts having an inlet formed between them where they adjoin for the supply of a fluid plastic into the cavity. In order to fill the mold, there may be used in combination with the mold an injector comprising a nozzle assembly, which has a nozzle with a relatively movable spout and valve, and means for raising the assembly into and out of engagement with the mold so that the spout enters and makes joint with the inlet and the valve opens to pass the fluid plastic.

The novel features that are considered characteristic of the invention are set forth with particularity in the appended claim. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 1 is a plan, partly in section, of the mold;
FIG. 2 is a longitudinal midsectional elevation, the section being taken on the line 2—2 of FIG. 1;
FIG. 3 is a longitudinal midsectional elevation of the apparatus used in the manufacture of a shoe in the performance of the invention;
FIG. 4 is a cross-sectional view taken on the line 4—4 of FIG. 3, and
FIG. 5 is an enlarged fragmentary cross-sectional view of the injection nozzle shown in FIGS. 3 and 4.

Referring now to the drawings, specifically to FIGS. 1 and 2, a mold M according to the present invention includes two outer framelike parts 10, 11 which are divided along a longitudinal central plane, indicated by the line 2—2 in FIG. 1. The two parts 10, 11, in use, are supported upon a stationary base (not shown). The two parts 10, 11 enclose two similarly divided slides 13, 14, which together form a mold cavity 15 having the contour of the sole to the molded. The cavity is bounded by a vertical wall 16.

The mold parts 10, 11 have longitudinally divided top plates 17, 18, composed of mild steel, the inner edges of which have precisely the same contour as the mold cavity 15, these edges forming the top portions of the cavity wall 16. These top plates 17, 18 function as the lip of the open mouth of the mold. Viewed in side elevation, as in FIG. 2, the lip formed by the plates 17, 18 is curved up and down relative to the horizontal to simulate the curvature of the sole of the foot of the eventual wearer. Moreover, the bottom 20 of the cavity is shaped in accordance with the form desired for the ground-engaging surfaces of the sole, including the heel, of the shoe.

The mold is designed for injection of a fluid plastic into the cavity 15, and to accommodate this injection, it is provided at one end, the "heel" end in the illustrated mold, with an injection passage 30. Preferably, this passage is provided in the joint between the slides 13, 14 by complemental channels which register to the passage 30 and an inlet mouth 31, which is cylindrical, opens through the top of the mold. These channels are formed in mild steel inserts 32 which are secured by screws 33 to the parts 10, 11 and which have ground faces to ensure that the joint between these faces, when they abut, is self-sealing. The passage 30 curves and then inclines downwards into the mold cavity.

A short upward curving passage 34 is formed in the cavity bottom 20 to register with the passage 30. This passage 34 ensures a comparatively unobstructed entry for the fluid plastic into the cavity. An air vent or outlet channel 35 is formed at the opposite, or "toe," end of the mold, this channel extending underneath the top plates 17, 18, where they adjoin, from the mold cavity 15 to the atmosphere. The mold is provided with any appropriate heating means and for example, an electric heating element may be inserted in a bore or hole 45 in one or each of the mold parts 10, 11.

The mold parts 10, 11 and the components framed by them are maintained in precise register by means of long locating pins 40 and 41 at opposite ends. Of these two locating pins, the pin 40 at the "toe" end of the mold is shown fully in FIG. 1. As shown, this pin has tapered ends, and it extends loosely inside a bore 42 in the part 11 and has a sliding fit through a bush 43 fitted tightly into the bore 42. Moreover, the pin fits into a bore 44 in the part 10. The arrangement at the "heel" end is similar. Thus, in order to separate the mold, the parts 10 and 11 are withdrawn from one another, in which motion each hardened bush 43 slides along its oppositely moving pin 40 or 41.

The apparatus also includes a pressure injection unit having a nozzle adapted to be inserted in the inlet mouth 31, as shown in FIGS. 3, 4 and 5. This injection unit comprises a tubular body 54 having an external thread at one end and terminating at the other end in an enlargement 54' having a recessed internal thread. A nozzle 50 is threaded into the enlargement 54' and forms jointly therewith a valve chamber 50', the nozzle 50 having an internal conical wall 63 forming the bottom of the valve chamber 50' and constituting a valve seat.

As best shown in FIG. 5, a combination valve and nipple element 51 is slidably mounted in the nozzle 50, this element 51 including a tubular nipple 51', slidable in and extending through the nozzle 50, and a valve element 62 on the inner end of the nipple 51' and cooperative with the valve seat 63. The valve element 62 comprises a frusto-conical portion, the smaller end of which is integral with the nipple 51'. At its larger end, the valve element 62 has a radially extending lip or flange 62' that constitutes the actual valve portion and is engageable with the valve seat 63.

The nipple 51' has a central longitudinal passage 51" opening through the outer end thereof. At its inner end, the passage 51" is in communication with at least one inlet 62" opening through the conical wall of the valve element 62 below the valve portion 62'. At its outer end, the nipple 51' is provided with a tapered or conical tip 51a and at its inner end the valve element 62 has an axially protruding stud 62a for locating a coil spring 64 which biases the valve and nipple element toward closed position. The spring 64 reacts against a seat 65' in a spider 65 located in the valve chamber 50' and having a plurality of passages 66 therethrough.

A head 61 is threaded on the upper end of the tubular injector body 54 and has an inlet nipple 67 to which is coupled a flexible tube 68 leading from a source of fluid plastic under pressure. The tubular portion of the body 54 is slidably mounted vertically in a bearing 53 that is carried by a bracket 52 which is suitably supported as by a post 52', as shown in FIG. 4. A spring 56 is coiled around the body 54 and compressed between the bearing 53 and head 61 so that it normally biases the body 54 upwardly to the limit imposed by engagement of the shoulder formed by the enlargement 54' with the underside of the bearing 53.

The bearing 53 is provided with a laterally extending ear 53' carrying a pin 59 to which one end of a link 58 is pivoted, as best shown in FIG. 3. The other end of said link 58 is pivoted by a pin 57 to one end of a lever 55 which has an intermediate yoke portion 55' straddling or surrounding the head 61 and journaled on a pair of trunnions 60 extending diametrically from said head 61. At its other end, the lever 55 terminates in a handle 55".
To facilitate illustration, the lever 55, link 58 and ear 53' are shown in FIG. 4 in phantom lines at right angles to their actual position which is shown in FIG. 3. The body 54 may have a keyway 54" cooperative with a key 53" in the bearing 53 to prevent twisting of the body and binding of the trunnions 60.

The normal position of the nozzle assembly is illustrated by FIGS. 4 and 5. As indicated in FIG. 4, the hand lever 55 is raised, the nozzle 50 also is raised so as to be well above the mold M, and the spout 51 also is raised so that the tip 51a of the nipple 51' is clear of the inlet mouth 31 of the mold M. When the operator presses the handle 55" and lever 55 downwards, the nozzle body 54 and associated assembly slides down through the bearing 53, the spring 56 becoming compressed so that the nipple 51' of the spout 51 enters the inlet mouth 31 and its tapered end or tip 51a seals itself in register with the inlet 30.

The operator continues to press the lever 55 downwards until the nozzle 50 itself abuts against the inserts 32 of the mold M. In this continued motion, there occurs a relative motion between the nozzle 50 and spout 51, which causes the valve 62 to open by its valve portion or lip 62' leaving its seat 63, as illustrated by FIG. 3. In this position, there is provided a free passage for fluid from the tube 68 and nipple 67 through the head 61, body 54, valve chamber 50' and spider passages 66, between the valve lip 62' and seat 63, into the valve inlets 62" and through the nipple passage 51" to the inlet 30.

Referring to FIG. 3, by way of illustration, the upper 70 and insole 71 of the shoe are shown diagrammatically as a single unit, or sock, which is supported upon a last 72. This upper-and-insole unit may be composed of leather, fabric or other suitable material. To prepare the unit for adhesion of the sole to be molded thereto, its bottom surface is roughened to produce a surface having minute protuberances of a fibrous character, the surface being such that the protuberances will root themselves into the sole forming fluid plastic.

It will be apparent that the preparation of the bottom of the upper-and-insole unit will depend on the nature of the material from which it is made and which may be leather or textile or rubber-like plastic, or may be the surface presented by a midsole to which the plastic sole is molded as an outsole. Such a midsole may be initially affixed to the underside of the upper-and-insole unit and may be composed of any of various materials, for instance felt, textiles, cellulose products such as paper and cardboard, expanded rubber, and rubber-like plastics either cured or uncured.

In performance of the method of manufacture, the two mold parts 10 and 11, together with the components framed by them, heated to the appropriate temperature, are slid tightly together so that they are positioned as in FIG. 1 and form the mold M. The lasted upper-and-insole unit 70, 71 is positioned on the empty mold cavity 15 in accurate register therewith and pressed down so that the unit seals itself against the lip formed by the top plates 17, 18 and in this way closes the mouth of the cavity 15, as illustrated in FIG. 3.

Next, the hand lever 55 is pressed down so as firstly to register the nipple 51' of the spout 51 in the inlet 30 and secondly to open the valve 62. In consequence, the fluid plastic is injected through the inlet 30 into the hot mold and fills the mold cavity 15, becoming pressed into the prepared bottom surface of the unit. The air in the cavity is driven out through the channel 35; moreover, air around the periphery can escape through the seal against the top plates 17, 18 which seal, although not airtight, totally retains the plastic despite its fluid condition. The plastic is shown in section in FIG. 3 within the mold only; for clearness, the plastic within the nozzle assembly is omitted.

When the mold is filled, the operator relieves his pressure on the lever 55 and permits it to rise under the action of the compressed return spring 56 so that the nozzle 50 rises from the inlet mouth 31, the valve 62 automatically closes under the action of its spring 64, and the spout 51 rises from the inlet 30. Meantime, under the action of the heat, the plastic in the mold solidifies. The contact between the nozzle assembly and mold is so small in area and so short in time that the injector assembly does not become heated and so the plastic in the cool assembly remains fluid. The mold is opened by sliding its parts 10 and 11 apart, and the lasted shoe is raised from the molding station.

It will be apparent from FIG. 3 that the molded sole comprises the sole proper 73, the heel 74, a long curved protuberance 75 formed by the inlet 30, a short curved protuberance 76 formed by the passage 34 and a small protuberance 77 formed by the air outlet 35. These protuberances are trimmed off. Thus, the finished solified plastic body 73, 74 is a precise replica of the mold interior and is free from disfigurement by air pockets or by protuberances produced around the sealed lips by spewed plastic.

The cooling of the molded sole to set it is preferably performed by removing the lasted shoe from the mold M, as described, and bringing the sole to room temperature in any of various ways. For instance, the lasted shoe may be suspended and cold air played on the sole; or the shoe may be placed with other similar shoes on racks and moved into a refrigeration chamber for a period; or the soles may be immersed in cold water. When the sole is cooled, a permanent completed adhesion between the bottom of the upper unit, with or without a midsole, and the plastic sole is secured.

As the sole material, any of the plastic compounds may be used, notably those based on the vinyl resins which will flow and which will solidify on heating. Polyvinylchloride (known as PVC) has been found suitable. These plastic compounds can be injected or poured in a fluid condition at room temperature and are, therefore, convenient for factory use.

It has been ascertained that the invention is especially efficacious where a cured rubber-like plastic, notably the vinyl resin polyvinylchloride, is used as the material of the upper unit to which the sole material is caused to adhere, there being no need for roughening or other preparation of the effective surface. It is found that the action of the heated fluid sole material has a superficial softening effect which gives the surface of the upper unit an adhesive absorbent character, so much so that the sole material intimately merges into the upper unit surface. In the subsequent cooling stage, the two materials weld themselves integrally together.

The mold can be filled by pouring, but it is preferable to inject the fluid plastic through a nozzle fitting into the mold and in this way, completely fill the mold under pressure. It is appropriate to use as the means for supporting and operating the mold parts 10 and 11 and the components enclosed by them and for supporting and operating the last 72 upon which the upper-and-insole unit is carried, the apparatus according to British Patent No. 714,241.

Although a certain specific embodiment of the invention has been shown and described, it is obvious that many modifications thereof are possible. The invention, therefore, is not to be restricted except insofar as is necessitated by the prior art and by the spirit of the appended claim.

That which is claimed as new is:

A mold for the pressure molding of a sole onto an upper, comprising two outer framelike parts divided along a longitudinal central plane and adapted to be supported upon a stationary base, two slides disposed within the framelike parts and divided along the same longitudinal central plane and together defining a mold cavity having the contour of a sole to be molded, longitudinally divided top plates the inner edges of which have the same contour as the mold cavity having the contour of a sole to be molded, longitudinally divided top plates the inner edges of which have the same contour as the mold cavity to define a lip at the mouth of a mold in which a shoe upper may be sealingly engaged, said plates being contoured relative to the horizontal to simulate the curvature of the sole of the foot of the eventual wearer, said mold having two passages respectively in communication with the heel and toe portions of said mold cavity, one of said passages constituting an injection passage defined in the joint between the slides by complemental channels and in communication with the lowermost portion of said mold cavity in the heel portion thereof, the other of said passages constituting an air outlet passage and being defined by complemental channels in the abutting sides of said slides and outer parts and opening through the top thereof and in communication with the uppermost portion of said mold cavity in the toe portion and constituting the only outlet opening in said cavity, whereby the passage arrangement provides for even penetration and distribution of a molding medium throughout the mold progressively from the heel portion and for prevention of air entrapment in the cavity, complemental inserts removably secured in complemental recesses in the outer parts at the outer end of said injection passage and having a continuation of said injection passage formed therethrough split along said longitudinal central plane and defined by a complemental channel in each insert, said inserts together defining an inlet mouth into which the molding medium is introduced, said inserts and the outer parts walls which they abut having ground faces to ensure that the joints between said faces are self-sealing, a portion of the top plates overlying that portion of said air outlet channels in the slides to close said channels, and slidable locating means in said parts for maintaining the parts and complemental channels in precise register, said passage forming complemental channels being in the separable faces of said parts to be exposed upon completion of molding operation and dismantling of the mold to facilitate cleaning.

References Cited in the file of this patent

UNITED STATES PATENTS

| 1,168,434 | Smith | Jan. 18, 1916 |
| 2,265,995 | Beyerlein | Dec. 16, 1941 |
| 2,318,031 | Tucker | May 4, 1943 |
| 2,359,839 | Goessling | Oct. 10, 1944 |
| 2,470,089 | Booth | May 17, 1949 |
| 2,559,609 | Foust | July 10, 1951 |
| 2,651,118 | Root | Sept. 8, 1953 |
| 2,651,810 | Snyder | Sept. 15, 1953 |

FOREIGN PATENTS

| 750,881 | Great Britain | June 20, 1956 |